United States Patent [19]

Montealegre

[11] 4,306,658
[45] Dec. 22, 1981

[54] CONVERTIBLE CONTAINER FOR PACKAGING AND COOKING

[75] Inventor: James Montealegre, Saint Paul, Minn.

[73] Assignee: Champion International Corporation, Stamford, Conn.

[21] Appl. No.: 55,161

[22] Filed: Jul. 6, 1979

[51] Int. Cl.³ .......................... B65D 5/54; B65D 5/66
[52] U.S. Cl. ................................ 206/611; 206/44 R; 229/31 R; 229/33
[58] Field of Search ...................... 229/31 R, 33, 41 B, 229/DIG. 3, 32, 30; 206/624, 611, 44 R, 45, 21; 426/110, 113, 122

[56] References Cited

U.S. PATENT DOCUMENTS

| 932,385 | 8/1909 | Gibson | 229/36 |
|---|---|---|---|
| 1,230,552 | 6/1917 | Bain | 229/31 R |
| 2,330,262 | 9/1943 | Biggs | 229/31 R |
| 2,443,431 | 6/1948 | Ringler | 229/31 R |
| 2,793,801 | 5/1957 | Papadopoulos | 229/33 |
| 3,118,590 | 1/1964 | Kersh et al. | 229/31 R |
| 3,154,052 | 10/1964 | Sweeney | 229/DIG. 3 |
| 3,168,975 | 2/1965 | Buttery et al. | 206/624 |
| 3,170,618 | 2/1965 | Sweeney | 229/DIG. 3 |
| 3,193,175 | 7/1965 | Moreton | 229/31 R |
| 3,415,358 | 12/1968 | Faller | 229/33 |
| 4,068,795 | 1/1978 | Forster | 229/31 R |
| 4,114,797 | 9/1978 | Manizza | 229/31 R |

FOREIGN PATENT DOCUMENTS

1178095  5/1959  France .................................. 229/31

Primary Examiner—Stephen P. Garbe
Attorney, Agent, or Firm—Evelyn M. Sommer

[57] ABSTRACT

A convertible container formed from a single sheet of paperstock includes a rectangular bottom wall, a plurality of upright side walls, and a top wall joined to an edge of one of the side walls. The top wall along with the side walls connected thereto may be unfolded to convert the container from a smaller packaging enclosure to an expanded cooking pan wherein the latter mentioned side walls form an extension of the bottom wall and the top wall is connected to a side wall. The corners formed by the side walls are connected by tuck flaps formed integral with the side walls which comprise a pair of segments integral with each other whereby to seal the corners of the container in order to prevent leakage of contents therefrom. A closure panel is removably connected to the top wall for enclosing and sealing the container prior to use thereof as a cooking pan.

7 Claims, 17 Drawing Figures

CONVERTIBLE CONTAINER FOR PACKAGING AND COOKING

TECHNICAL FIELD

This invention relates to the packaging art, and deals more particularly with a packaging container which may be unfolded to convert the same for use as a cooking pan.

BACKGROUND AND BRIEF DESCRIPTION OF THE INVENTION

The trend toward quick food preparation by consumers encouraged by microwave ovens and other recent innovations have prompted the development of numerous types of packaging containers to speed food preparation. One such packaging container is employed for the dual function of packaging food products for shipping and storage thereof, and for also cooking the contents in an oven when the food is being prepared for consumption.

The prior art packaging container mentioned above comprises a front, rear, bottom and top wall, and end walls joined together to form a tubular container having an essentially rectangular cross-section. The rear wall is swingably connected to the side walls by pleated folding flaps, while the top wall is pivotally connected by a fold line to the swingable back wall. The top and back walls enclose the contents within the container for shipping and storage purposes, but may be unfolded when the container is opened by a consumer whereby the back wall forms an extension of the bottom wall and the top wall forms a side wall in a manner to provide a rectangularly shaped, open topped cooking pan for cooking food products previously packaged therewithin.

The prior art packaging container mentioned above was less than completely desirable in several respects. First, the side wall panels defining the cooking panel configuration of the container were joined together at the corners thereof by slit and locking tab combinations; this type of corner locking structure often allowed the uncooked contents within the pan to leak out of the container through the corners during the cooking process. Also, it was previously necessary to provide a top wall which was identical in size and shape to the bottom wall in order that the various panels of the container could be folded into the packaging configuration thereof to form a completely enclosed structure. Although raw food product ingredients, such as cake mixes, displace relatively little volume within the container during storage, the food products substantially expand in volume during the cooking process. Thus, only a relatively small quantity of ingredients may be packaged within prior art containers since the size of the unfolded cooking pan is limited by the size of the top wall which is required to enclose the container in the packaging configuration thereof.

The present invention provides a convertible packaging and cooking container which overcomes each of the difficiencies mentioned above inherent in the prior art container. According to the present invention, a convertible packaging and cooking container includes a bottom wall, three stationary side walls, a fourth swingable side wall pivotally mounted to the bottom wall, and a swingable top wall joined to the swingable side wall. The extremities of the swingable side wall are connected by pleated folding flaps to the adjacent stationary walls. Each of the side walls in the cooking pan configuration of the container are connected with each other by tuck flaps formed integral therewith. The tuck flaps each comprise a pair of segments formed integral with each other whereby the corners of the pan are completely enclosed by a continuous fold of material to prevent leakage of contents from the pan during the cooking operation. A closure panel is removably attached along one edge of the top wall and encloses a substantial portion of the top of the container when in the packaging configuration thereof, whereby to allow the use of a substantially larger bottom wall. The packaging container and cooking pan, along with the associated closure panel therefore may be formed from a blank comprising a single sheet of paperstock.

BRIEF DESCRIPTION OF THE DRAWINGS

In the drawings, which form an integral part of the specification and are to be read in conjunction therewith, and in which like parts are designated by like reference numerals in the various views.

DETAILED DESCRIPTION OF THE INVENTION

Figure 1:
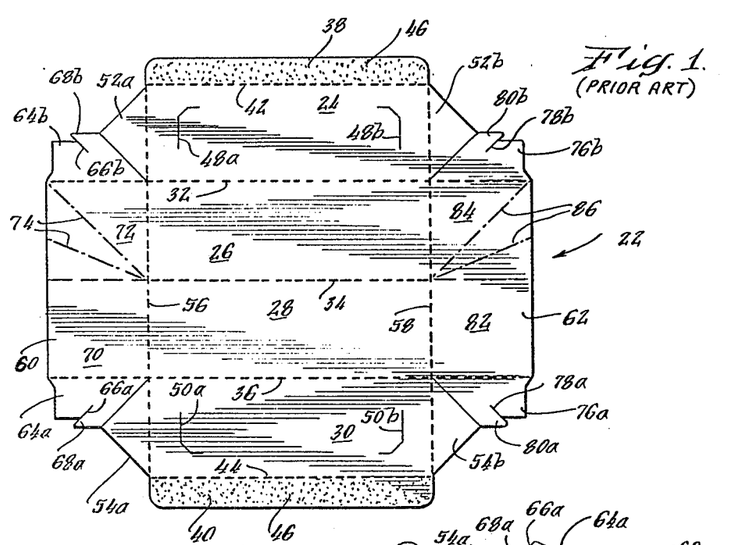
FIG. 1 is a top plan view of a blank for forming a prior art packaging container and cooking pan.
Figures 3, 4:
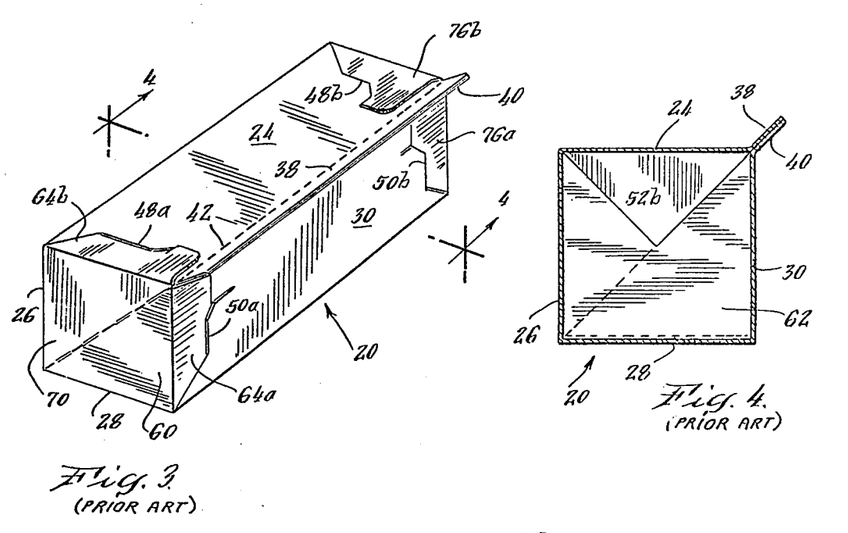
FIG. 3 is a perspective view of the prior art container and pan formed from the blank of FIG. 1, shown in the packaging container configuration thereof.
FIG. 4 is a cross-sectional view taken along the line 4—4 in FIG. 3.

Referring first to FIGS. 1-5, a prior art container generally indicated by the numeral 20 in FIGS. 3 and 4 is constructed by folding a unitary blank of paperstock, broadly designated by the numeral 22 in FIG. 1. Blank 22 includes a top panel 24, rear panel 26, bottom panel 28 and front panel 30, which are each generally rectangular in shape and are respectively divided by the parallel fold lines 32, 34 and 36.

Top panel 24 and front panel 30 are provided with a closure flap 38 and 40 respectively which are joined to the corresponding panels by associated fold lines 42 and 44. A suitable adhesive 46 may be applied to one face of the closure flaps 38 and 40. Top panel 24 and front panel 30 are each further provided with a pair of spaced apart cut lines 50a, 50b, and 48a, 48b which extend through the paperstock and form slits in the latter.

Top panel 24 and front panel 30 are each further provided with a triangularly shaped tuck flap 52a, 52b and 54a, 54b respectively which are joined along opposite edges thereof by spaced apart, parallel fold lines 56 and 58 which extend essentially the entire length of one dimension of the blank 22. Side wall flaps 60 and 62 are joined by the fold lines 56 and 58 to opposite edges of the rear and bottom panels 26 and 28 respectively. Side wall flap 60 include locking flaps 64a and 64b joined along opposite edges by extensions of the fold lines 32 ad 36. Locking flaps 64a and 64b are irregular in shape and include diagonal cut lines 66a and 66b which define male locking tabs 68a and 68b. Side wall flap 60 further includes first and second essentially rectangular portions 70 and 72 separate by an extension of the fold line 34. Rectangular portion 72 includes a pair of divergent score lines 74 which extend from the intersection of fold lines 34 and 56.

Side wall flap 62 comprises components which form the mirror image of those described to respect to side wall flap 60, and include a pair of locking flaps 76a and 76b having corresponding cut lines 78a and 78b and locking tabs 80a and 80b. Side wall flap 62 further includes first and second rectangular portions 82 and 84, while rectangular portion 84 is provided with a pair of divergent score lines 86 extending from the intersection of fold lines 34 and 58.

Figure 2:
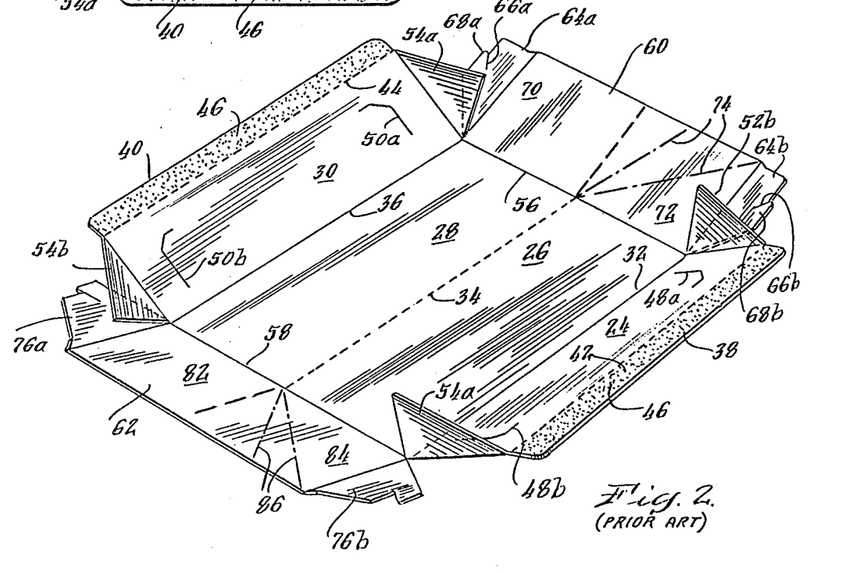
FIG. 2 is a perspective view of the blank of FIG. 1 but showing the blank in a partially folded state thereof.

As shown in FIG. 2, the blank 22 is folded by first rotating the tuck flaps 52a, 52b, 54a and 54b about their respectively associated fold lines 56 and 58, 90° to a position perpendicular with respect to the corresponding top panel 24 and front panel 30. Top panel 24 and front panel 30 are then pivoted 90° upwardly about the corresponding fold lines 32 and 36 to a position perpendicular with respect to rear and bottom walls 26 and 28 respectively. Side wall flaps 60 and 62 are then pivoted upwardly 90° about their respectively associated fold lines 56 and 58 to an upright position and into abutting, overlapping relationship to the tuck flaps 52a, 52b, 54a and 54b. Simultaneous with the folding of side wall flaps 60 and 62, the locking tabs 68a, 68b and 88 and 80b are inserted into the respectively associated slits formed by the cut lines 52a, 50a, 52b and 50b, thereby locking the side wall flaps 60 and 62 into their upright relationship with the top and front panels 24 and 26. Rear panel 26 is then pivoted upwardly 90° about the fold line 34 to an upright position while sections of the second rectangular portions 72 and 84 defined between the fold lines 74 and 86 are folded inwardly. Upon completion of the last mentioned folding step, the second rectangular portions 72 and 84 are each folded about themselves into two sections which are disposed within the interior of the container and in abutting relationship to the respectively corresponding first rectangular portions 82 and 70, while the top panel 24 extends horizontally over the bottom panel 28, whereby to enclose the interior of the container. The closure flaps 38 and 40 may then be brought into contact with each other in order to both seal the carton 20 and maintain the same in a folded condition until later opened.

Figure 5:
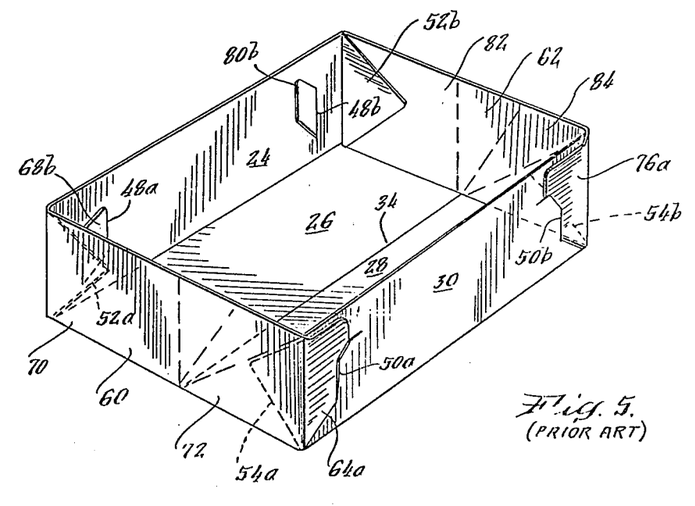
FIG. 5 is a perspective view of the container and pan of FIG. 3, but shown unfolded to the cooking pan configuration thereof.

The prior art container 20 is particularly adapted to store premeasured quantities of ingredients, such as a cake mix or the like therein, which may be packaged within a flexible pouch of plastic that is inserted into the container 20 prior to folding thereof into the condition shown in FIG. 3. In use, the consumer tears the closure flaps 38 and 40 along the front panel 30. Top panel 24 and rear panel 26 are then pivoted rearwardly away from front panel 30, 90° about fold line 44, to a condition shown in FIG. 5. After having folded the container 20 to a condition shown in FIG. 5, the user may then empty the contents of the plastic pouch into the container and add other ingredients thereto, such as water, to form a batter within the container 20. Thus, the container 20 as shown in FIG. 5 provides a cooking pan which may be inserted directly into a microwave oven or the like for cooking the ingredients without resort to a separate utensil or pan.

Although the combination cooking pan/container 20 described above was generally acceptable for its intended purpose, several features thereof warrant improvement. For example, the use of separate locking flaps 64 and cut lines 66 to form the corners of the carton 20 permitted some leaking of the contents, particularly after liquid had been added, since the resulting seal at the corners was not liquid tight. Moreover, the lock tabs 68 and edges of the tuck flaps 62 produced indentations in the sides of the food product being baked. Finally, the overall size of the container 20 when opened to its cooking pan configuration was limited by the width of the top panel 24, since the top panel 24 and bottom panel 28 were required to be of the same size in order to fold the container 20 into the reduced, storage condition thereof shown in FIG. 3; consequently, the amount of food product which could be baked in the prior art cooking pan container was unnecessarily limited.

The present invention provides an expandable container for storing and cooking food which overcomes each of the deficiencies mentioned above inherent in the prior art container design.

Figure 6:
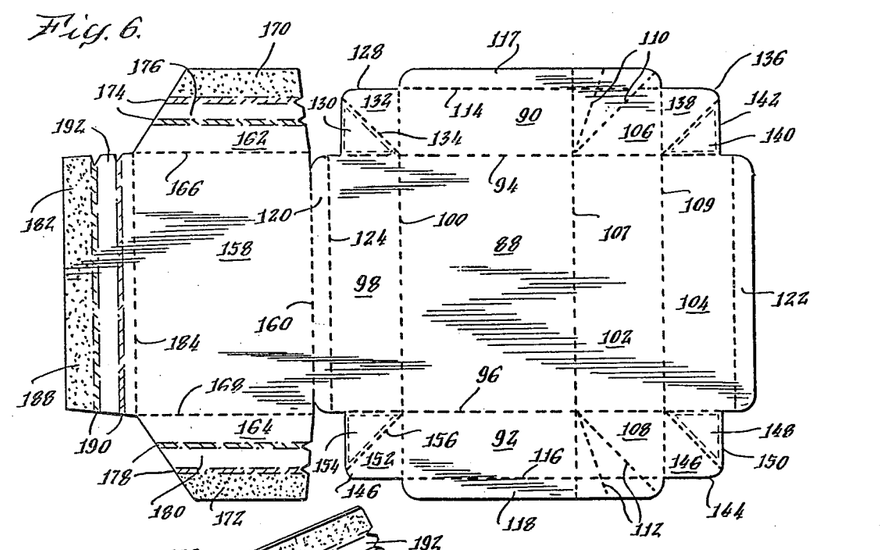
FIG. 6 is a plan view of the blank for forming the convertible packaging container and cooking pan comprising the preferred form of the present invention, which includes one form of a closure panel therefor.
Figure 7:
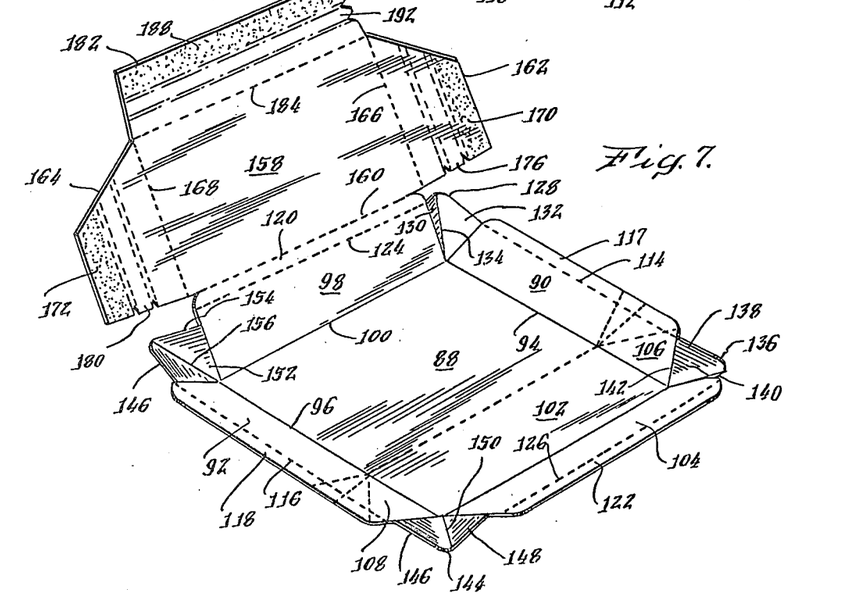
FIGS. 7-9 are perspective views showing the sequential steps in folding the blank of FIG. 6 into the packaging container configuration thereof.

Referring now also to FIGS. 6-10, the container of the present invention is formed from a blank comprising a single sheet of paperstock, as shown in FIG. 6. The blank includes a rectangular bottom wall panel 88, a first and second side wall panel 90 and 92 respectively joined by corresponding fold lines 94 and 96 along opposite, opposing edges of bottom wall panel 88. The blank further includes a third side wall panel 98 joined by a fold line 100 to a lateral edge of the bottom wall panel 88, while a first and second swingable panel 102 and 104 respectively which are hingedly coupled to each other and to the remaining lateral edge of bottom wall panel 88 by the corresponding fold line 106 and 109 which extend parallel to the fold line 100. First and second swingable panels 102 and 104 and third side wall panel 98 are essentially equal in width, but are approximately half as wide as the bottom wall panel 88.

First swingable panel 102 has a pair of extension panels 106 and 108 hingely joined to opposite edges thereof by corresponding extensions of the fold lines 94 and 96; these extension panels 106 and 108 are formed integral with the first and second side wall panels 90 and 92, and are hingedly joined to the latter by an extension of the fold line 107. Extension panel 106 includes a pair of fold lines 110 which extend from the intersection of the fold lines 94 and 107 radially outwardly toward the free outer edge of such extension panel and away from each other. Similarly, extension panel 108 is provided with a pair of fold lines which extends outwardly away from intersection of fold lines 96 and 107 toward the free outer edge of such extension panel, and away from each other.

The combination of first side wall panel 90 and extension panel 106 includes a fold line 114 therein extending parallel to the fold lines 94 and 96 and defines a flange 117 which extends the entire width of the combination of bottom wall panel 88 and first swingable panel 102. Similarly, the combination of second side wall panel 92 and extension panel 108 is provided with a fold line 116 therein extending parallel to the fold lines 94 and 96 and defining a flange 118 which is coextensive with the combined width of bottom wall panel 88 and first swingable panel 102.

The third side wall panel 98 and second swingable panel 104 are provided with flanges 120 and 122 along the corresponding outer edges thereof which are defined by associated fold lines 124 and 126 and are essentially equal in width to the flanges 117 and 118.

A tuck flap 128 is joined to adjacent edges of first side wall panel 90 and third side wall panel 98 by extensions of fold lines 100 and 94, which tuck flap 128 is essentially rectangular in shape. Tuck flap 128 comprises a pair of triangularly shaped segments 130 and 132 which are formed integral with each other and are divided by a fold line 134 which extends outwardly from the intersection of fold lines 94 and 100. It is to be noted that the tuck flap 128 is formed integral with the adjacent first side wall panel 90 and third side wall panel 98. Similarly, a tuck flap 136 having a pair of segments 138 and 140 divided by a fold line 142 is joined integral with adjacent edges of first side wall panel 90 and second swingable panel 104. Likewise, a tuck flap 144 and 146 is formed integral with the second swingable panel 104 and third side wall panel 98 respectively opposite the tuck flaps 136 and 128. Tuck flap 144 includes a pair of triangular shaped segments 146 and 148 divided by a fold line 150, while tuck flap 146 similarly comprises a pair of integrally formed, triangularly shaped segments 152 and 154 divided by a diagonally extending fold line 156. Segments 130, 140, 148 and 154 may have a suitable adhesive preapplied thereto.

The blank further comprises a rectangularly shaped closure panel 158 having dimensions essentially identical to bottom wall panel 88. One edge of closure panel 158 is removably and hingedly secured by perforated score line 160 to the outer edge of flange 120. Closure panel 158 is provided with a pair of trapezoidally shaped end flaps 162 and 164 joined to opposite edges of closure panel 158 by corresponding fold lines 166 and 168. The margins of the outer edges of end flaps 162 and 164 are respectively provided with a suitable adhesive 170 and 172 respectively preapplied thereto. End flap 162 includes a pair of parallel, spaced, preformed lines of weakness 174 in medial sections thereof defining a tear strip 176. Similarly, end flap 164 includes a pair of spaced, parallel, preformed lines of weakness 178 therein defining a tear strip 180 therein.

Closure panel 158 further includes a front flap 182 hingedly joined thereto by a fold line 184 which extends essentially parallel to the perforated score line 160. Front flap 182 includes a strip of adhesive 188 preapplied to the outer margin thereof, and includes a pair of spaced, parallel, preformed lines of weakness 190 therein which extend parallel to fold line 184 and define a tear strip 192 therebetween.

The blank shown in FIG. 6 is erected into a container in the following manner. Each of the panels 90, 92, 98 and 104 are pivoted 90° about the corresponding fold lines 94, 96, 100 and 109 to an upright position, perpendicular to the bottom wall panel 98 while tuck flaps 128, 136, 144 and 146 are simultaneously folded outwardly with respect to the corresponding panels 90, 92, 98 and 104, thereby bringing the respective pairs of segments 130 and 132, 138 and 140, 146 and 148, and, 152 and 154 into essentially face-to-face relationship to each other. Segments 130 and 154 are then pivoted toward each other and into overlapping relationship to the exterior surface of third side wall panel 98, and are adhesively joined to the exterior face of panel 98. At this point segments 132 and 152 respectively overlap segments 130 and 154. Similarly, segments 140 and 148 are pivoted toward each other and into overlapping relationship to the exterior surface areas of second swingable panel 104, and become adhesively joined to the exterior face of panel 104. Segments 138 and 146 respectively overlap segments 140 and 148. At this stage, panels 90, 92, 98 and 104 define upstanding walls and, in combination with bottom panel 88 form a rectangularly shaped cooking pan.

Next, extension panels 106 and 108 are pivoted 180° about the respectively corresponding extensions of fold line 107 and into overlapping relationship with the exterior faces of first and second side wall panels 90 and 92. During the last step, the triangularly shaped segments in the extension panels 106 and 108 defined by the fold lines 110 and 112 may pivot slightly with respect to the latter mentioned fold lines to facilitate the hinging action. Also, during the last mentioned step, first and second swingable panels 102 and 104 pivot 90° about fold line 107, whereby the second swingable panel 104 assumes a horizontal position spaced above the bottom wall panel 88 and parallel to the latter, while the first swingable panel is converted to a front wall of the container and is disposed essentially parallel to the third side wall panel 98.

At this point, the container has been folded into its compact, storage configuration while the closure panel 158 is open to permit access to the container through an opening between second swingable panel 104 and the third side wall panel 98. A premeasured separately packaged quantity of food product or the like may be inserted into the container through the opening mentioned above. The container is then sealed by pivoting the closure panel 158 90° about the perforated score line 160 into overlaying relationship to the second swingable panel 104 thereby closing access to the container. Finally, end flaps 162 and 164 as well as front flap 182 are each pivoted 90° downwardly into overlapping, adhesive contact with the corresponding panels 90, 92 and 102.

Figures 8, 9, 10, 11:
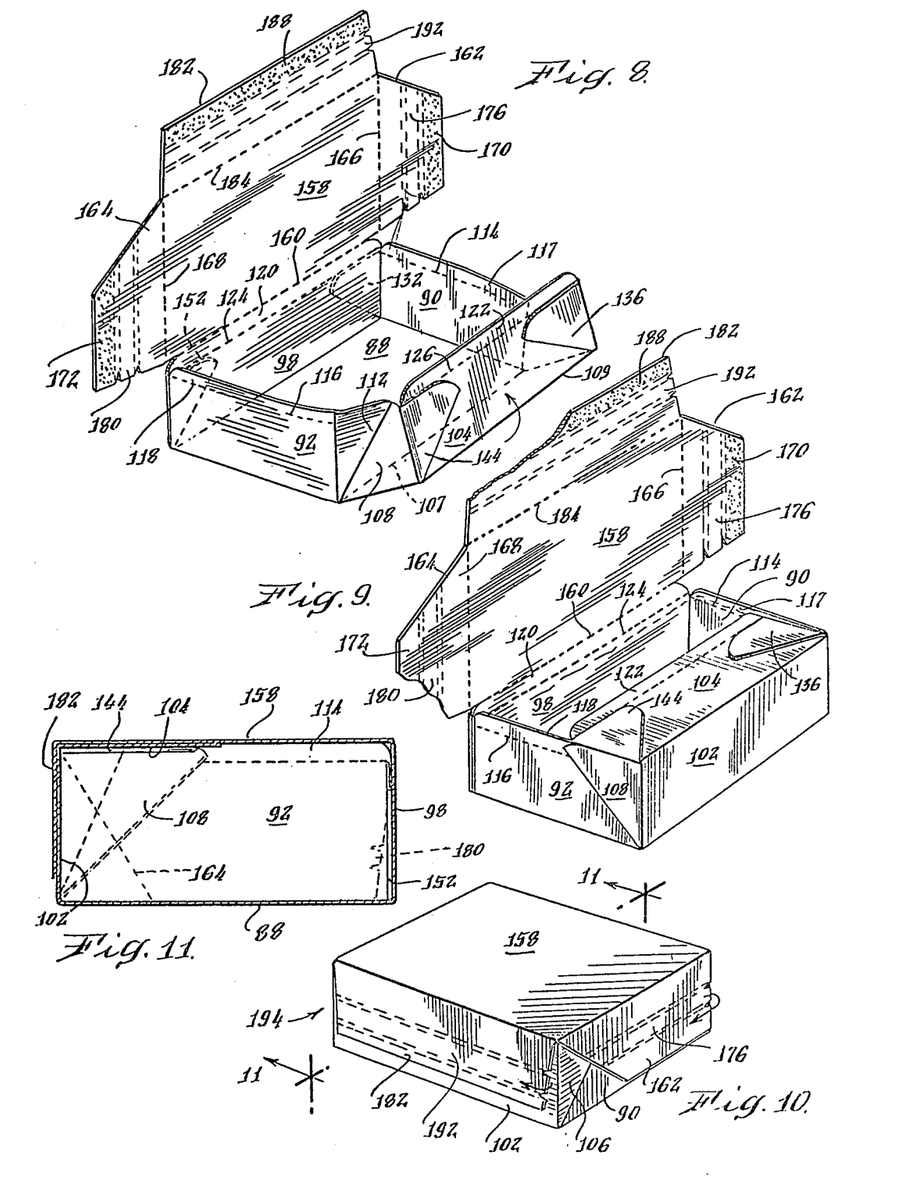
FIG. 10 is a perspective view of the container shown in the packaging configuration thereof, with a closure panel having been folded and sealed thereover.
FIG. 11 is a cross-sectional view taken along the line 11—11 in FIG. 10.

At this stage, the container generally indicated by the numeral 194 in FIG. 10 is in a packaging configuration which is suitable for storing and transporting the uncooked food products therewithin. When ready for use by a consumer, however, the container 194 may be simply opened and converted to a cooking pan in the following manner. An edge of each of the tear strips 176, 180 and 192 is grasped and such tear strips are pulled away from the container causing the end flaps 162 and 164 and the front flap 182 to be torn along the corresponding preformed lines of weakness therein, thereby separating flaps 162, 164 and 182 from the side walls of the container and leaving strips 196 thereon. The closure panel 158 may then be pivoted upwardly to open the container and is removed by tearing the same along the perforated score line 160. Closure panel 158 may be discarded at this point.

Figures 12, 13:
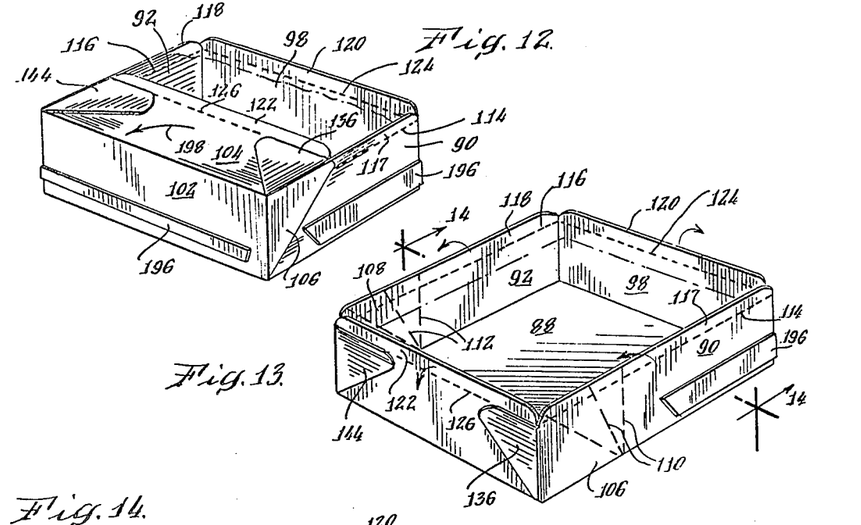
FIG. 12 is a perspective view similar to FIG. 10 after the closure panel has been removed from the container.
FIG. 13 is a perspective view similar to FIG. 12 after the swingable side and top wall has been unfolded to convert the container to the cooking pan configuration thereof.

Next, the combination of the first and second swingable panel is pivoted away from the third side wall panel 98 and in the direction of the arrow 198 whereby the first swingable panel 102 is disposed essentially coplanar with the bottom wall panel 98 and forms and extension of the latter, while the second swingable panel 104 is converted from a top wall to the fourth side wall of the container. At this point, the container has been converted into a cooking pan configuration and the user may then empty the ingredients previously stored and packaged within the container into the open cooking pan and combined with a liquid to form a raw batter or the like to be subsequently baked. The flanges 117, 118, 120 and 122 may be pivoted outwardly in the direction of the arrows shown in FIG. 13 and about the corresponding fold lines 114, 116, 124 and 126 to an essentially horizontal position, thereby rigidifying the container.

It may be appreciated that the because the tuck flaps 128, 136, 144 and 146 are formed integral with the side walls of the container, the corners of the container are leakproof since they are formed from a continuous fold of material. Moreover, the employment of a novel closure panel in combination with the container and cooking pan allows the employment of a substantially larger bottom wall, compared to prior art designs, which permits cooking a larger quantity of food product. It is important to also note that because the tuck flaps 128, 136, 144 and 146 are folded outwardly, the corners formed by the panels 90, 92, 98 and 104 provide smooth continuous interior cooking surfaces which result in the cooked product having smooth lateral faces in contrast to the lines of indentations therein produced by prior-type containers.

Figures 14, 15:
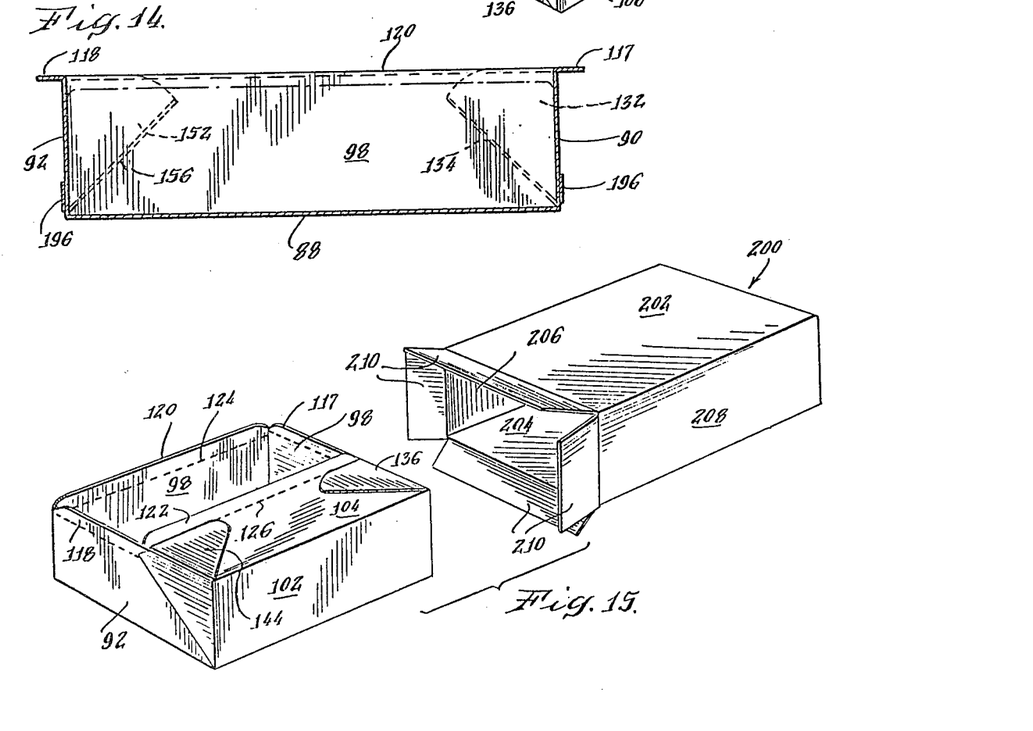
FIG. 14 is a cross-sectional view taken along the line 14—14 in FIG. 13.
FIG. 15 is a perspective view of the container shown in the packaging configuration thereof adjacent an alternate means for closing and sealing the same for packaging and shipping.

As an alternative to the use of the closure panel 158, the container can be enclosed in its collapsed condition for storage and shipping purposes in a separate box generally indicated by the numeral 200 in FIG. 15 which comprises top, bottom, and end walls, 202, 204, 206 and 208 forming a tube or sleeve into which the container may be inserted. The box 200 may include end flaps 210 on opposite ends thereof for enclosing and sealing the container therewithin.

Figure 16:
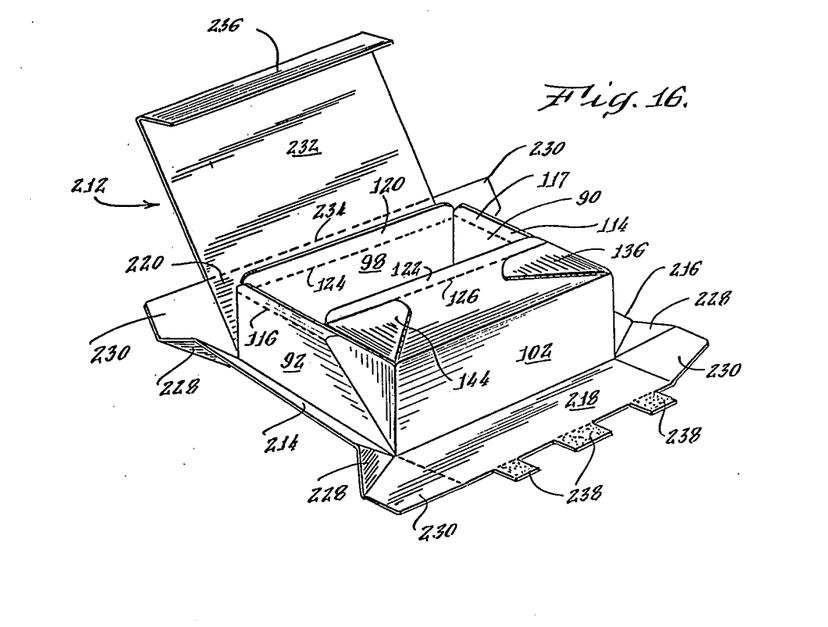
FIG. 16 is a perspective view of the container similar to FIG. 15 but showing still another form of closure structure during an intermediate step in folding the closure structure around the container.
Figure 17:
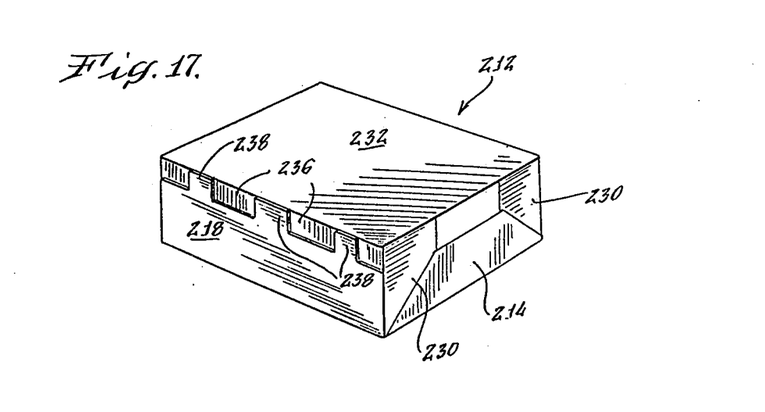
FIG. 17 is a view similar to FIG. 16 but showing the closure structure completely folded around the container.

Additionally, the container may be enclosed within a wrap-around wrapper designated generally by the numeral 212 in FIGS. 16 and 17. Wrapper 212 includes a pair of side walls 214 and 216 respectively, a front wall 218, a rear wall 220, joined to a bottom wall (not shown) and to each other by a series of collapsable joining flaps 228. Front and rear walls 218 and 220 are each provided with a closure flap 230 hingedly connected thereto which may be folded over into underlying relationship to the side walls 214. Rear wall 220 is provided with a top closure panel 232 hingedly connected by fold line 234. Top closure panel 232 includes a flap member 236 joined along one edge thereof which is shifted into overlapping relationship to the first swingable panel 102. Front wall 218 includes a plurality of spaced, rectangularly shaped flap members 238 having a suitable adhesive applied to one face thereof which register with and are attached to the flap member 236 in order to hold the wrapper 212 around the container.

From the foregoing, it is apparent that the packaging and cooking panel container disclosed herein not only provides for the reliable accomplishment of the object of the invention, but does so in a particularly effective and simple manner. It is recognized, of course, that those skilled in the art may make various modifications or additions to the preferred embodiment chosen to illustrate the invention without departing from the gist and essence of the present contribution of the art. Accordingly, it is to be understood that the protection sought and to be afforded hereby should be deemed to extend to the subject matter claimed and all equivalents thereof fairly within the scope of the invention.

What is claimed is:

1. An expandable container for storing and cooking food, comprising:
   a rectangular bottom wall;
   a first and second side wall extending upwardly from said bottom wall and respectively joined to one pair of opposing edges of said bottom wall;
   a third side wall extending upwardly from said bottom wall and joined to a third edge of said bottom wall,
   said first and second side walls forming a first pair of corners with opposite extremities of said third wall and respectively joined to the last-mentioned extremities by a first pair of tuck flaps,
   each of said first pair of tuck flaps comprising a pair of segments formed integral with each other and with said third side wall and the corresponding first and second side wall whereby to prevent leakage of contents within said container through said first corners;
   a first swingable panel formed integral with said bottom wall and joined to the fourth edge of said bottom wall by a fold line in the latter, said first swingable panel being swingable between a horizontal position essentially coplanar with said bottom wall forming an extension of the latter, and an upright position forming a fourth side wall of said container,
   the opposite extremities of said first swingable panel being respectively hingedly connected to said first and second panels by folding flaps; and
   a second swingable panel formed integral with the combination of said first swingable panel and said bottom wall, and joined along one edge of said first swingable panel by a fold line in the latter, said second swingable panel being swingable between a horizontal position forming a top wall of said container when said first panel is in said upright position thereof, and an essentially upright position forming said fourth side wall of said container when said first panel is in said horizontal position thereof,
   the opposite extremities of said second panel forming corners with said folding flaps when said second panel is in said upright position thereof and respectively joined to said folding flaps by a second pair of tuck flaps, each of said latter-mentioned tuck flaps comprising a pair of segments formed integral with each other and with the corresponding ones of said fold flaps whereby to prevent leakage of contents within said container through said second corner, said bottom wall and said second panel being essentially equal in length and the width of said bottom wall exceeds the width of said second panel whereby to form an opening in the top of said container when said second panel is in said horizontal position thereof.

2. The container of claim 1, wherein said first wall, said second wall, said third wall and said second panel each include a flange hingedly formed integral therewith along an outer edge thereof by a fold line therein.

3. The container of claim 1, including a closure panel removably connected along one edge of said second panel and extending over said opening in said container when said second panel is in said horizontal position thereof, said closure panel including a first, second and third closure flap respectively overlapping said first, second and third side walls and joined to said latter mentioned walls whereby to hold said second panel in said closed position thereof.

4. The container of claim 3, wherein each of said closure flaps includes a pair of spaced, elongate, preformed lines of weakness therein defining a removable tear strip for releasing said closure flaps from the corresponding ones of said side wall panels.

5. The container of claim 1 wherein at least one tuck flap in said first pair thereof is disposed in overlapping relationship to the exterior face of said third side wall.

6. The container of claim 5 wherein at least one of said tuck flaps in said second pair thereof is disposed in overlapping relationship to exterior surface areas of said second swingable panel.

7. The container of claim 1 wherein said tuck flaps in said first pair thereof are respectively disposed in overlapping relationship to exterior surface areas of said first and second side wall.

* * * * *